(12) United States Patent
Ouyoung

(10) Patent No.: US 6,808,130 B1
(45) Date of Patent: Oct. 26, 2004

(54) SPRAY HEAD KITCHEN FAUCET

(75) Inventor: Scott Ouyoung, Taichung Export Processing Zone (TW)

(73) Assignee: Globe Union Industrial Corp., Taichung Export Processing Zone (TW)

( * ) Notice: Subject to any disclaimer, the term of this patent is extended or adjusted under 35 U.S.C. 154(b) by 8 days.

(21) Appl. No.: 10/435,545

(22) Filed: May 12, 2003

(51) Int. Cl.[7] .............................................. A62C 31/00
(52) U.S. Cl. .................................... 239/441; 239/102.1
(58) Field of Search .......................... 239/102.1, 102.2, 239/437, 438, 439, 440, 441, 459

(56) References Cited

U.S. PATENT DOCUMENTS 1,893,298 A * 1/1933 Moore ........................ 239/441
3,111,273 A * 11/1963 Mei ........................ 239/441 X
5,979,800 A * 11/1999 Takagi ........................ 239/440
6,565,014 B1 * 5/2003 Hsieh ...................... 239/441 X

* cited by examiner

Primary Examiner—Robert M. Fetsuga
(74) Attorney, Agent, or Firm—Leong C. Lei

(57) ABSTRACT

A spray head kitchen faucet essentially comprised of a body including base holder, adapter, and inner tube, inner cylinder, cartridge, guide, diverter, retaining ring, wave generator unit, spout, and control handle, wherein, displacement of the guide being regulated through the cartridge by the extent the handle is pressed, and the tap water entering into the body to be delivered trough the diverter and the sprout in jet or in sprinkle mode.

1 Claim, 5 Drawing Sheets

SPRAY HEAD KITCHEN FAUCET

BACKGROUND OF THE INVENTION (a) Field of the Invention

The present invention is related to a spray head kitchen faucet, and more particularly, to one provided with an extension for the spray head to be separately pulled out for use to facilitate washing to clean the kitchen sink set or the kitchen.

(b) Description of the Prior Art

Single handle kitchen faucet generally available in the market is usually used in modern kitchen, particularly in well-developed countries including Japan, USA and those in Europe. However, its spout delivers only one mode of water as that from an ordinary stem faucet and fails to deliver the water jet effectively to clean the kitchen or areas other than the sink, thus to significantly offset the efficacy of the kitchen faucet.

SUMMARY OF THE INVENTION

The primary purpose of the present invention is to provide a kitchen faucet with a spray head for the kitchen faucet to be more practical in the kitchen. To achieve the purpose, a guide and a diverter adapted with a cartridge are provided to control the tap water entering into the faucet to be delivered out of the spout either in jet or in sprinkle mode depending on the pressure applied to the handle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
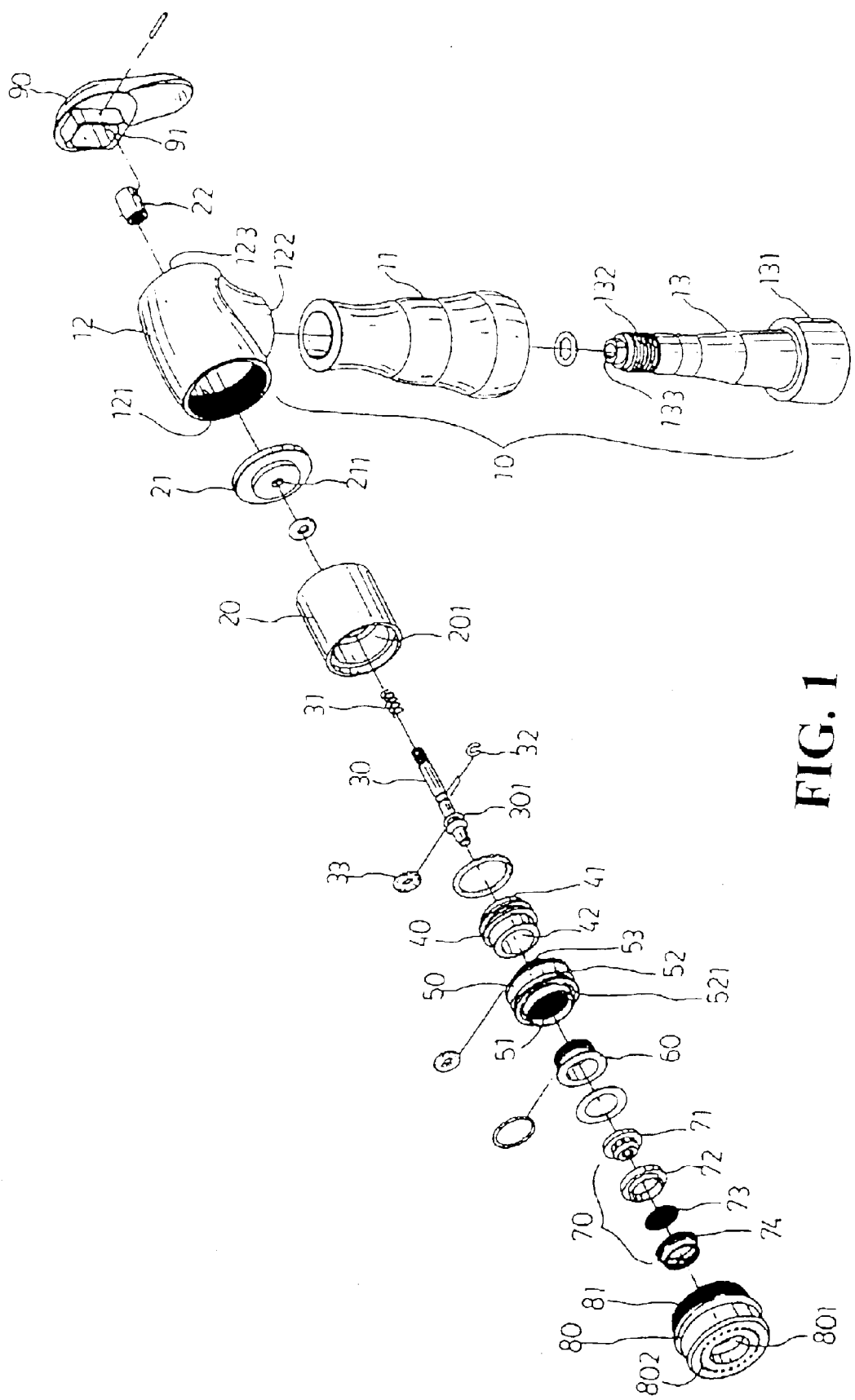
FIG. 1 is an exploded view of a preferred embodiment of the present invention.
Figure 2:
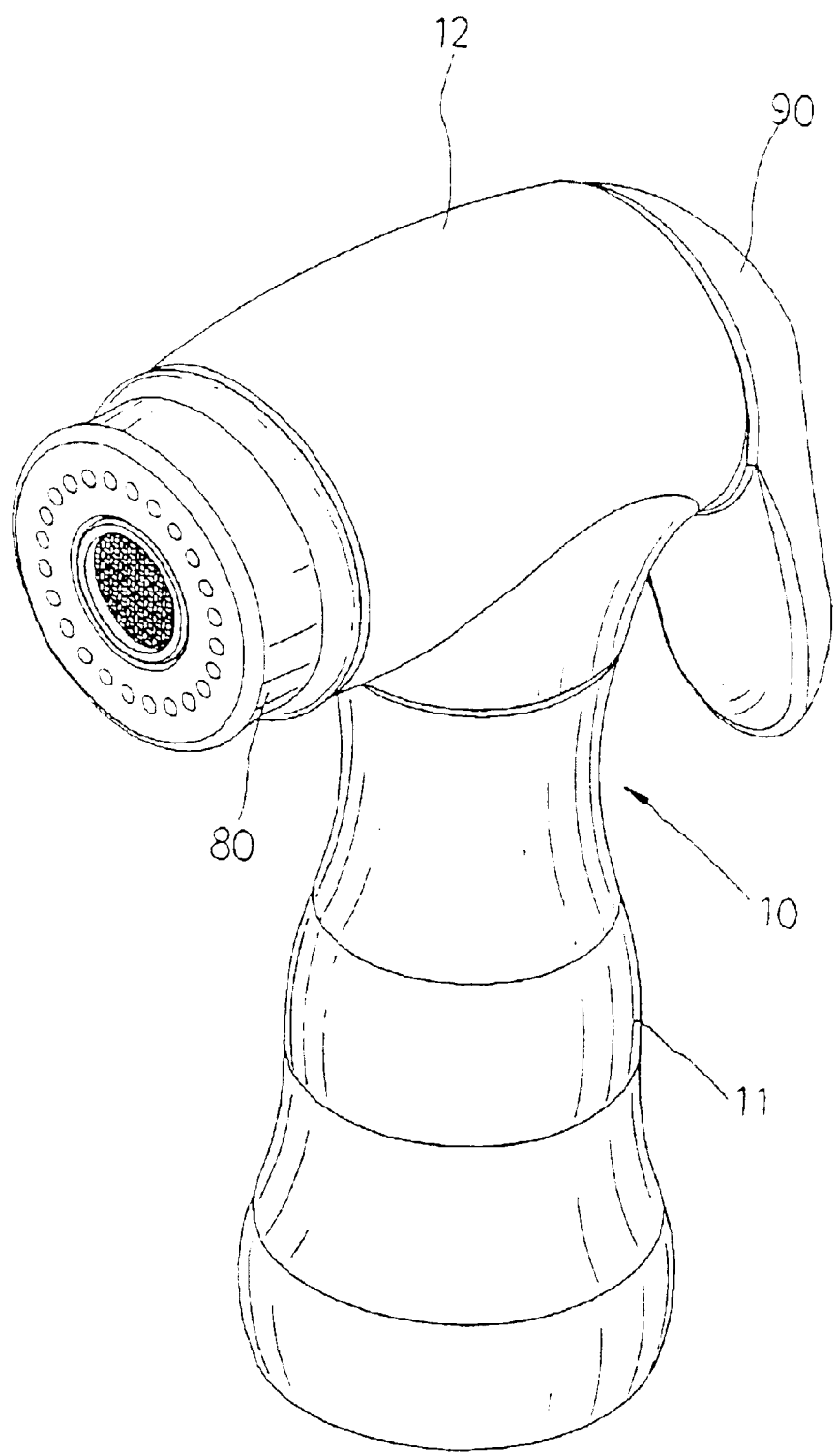
FIG. 2 is a schematic view of the preferred embodiment of the present invention as assembled.
Figure 3:
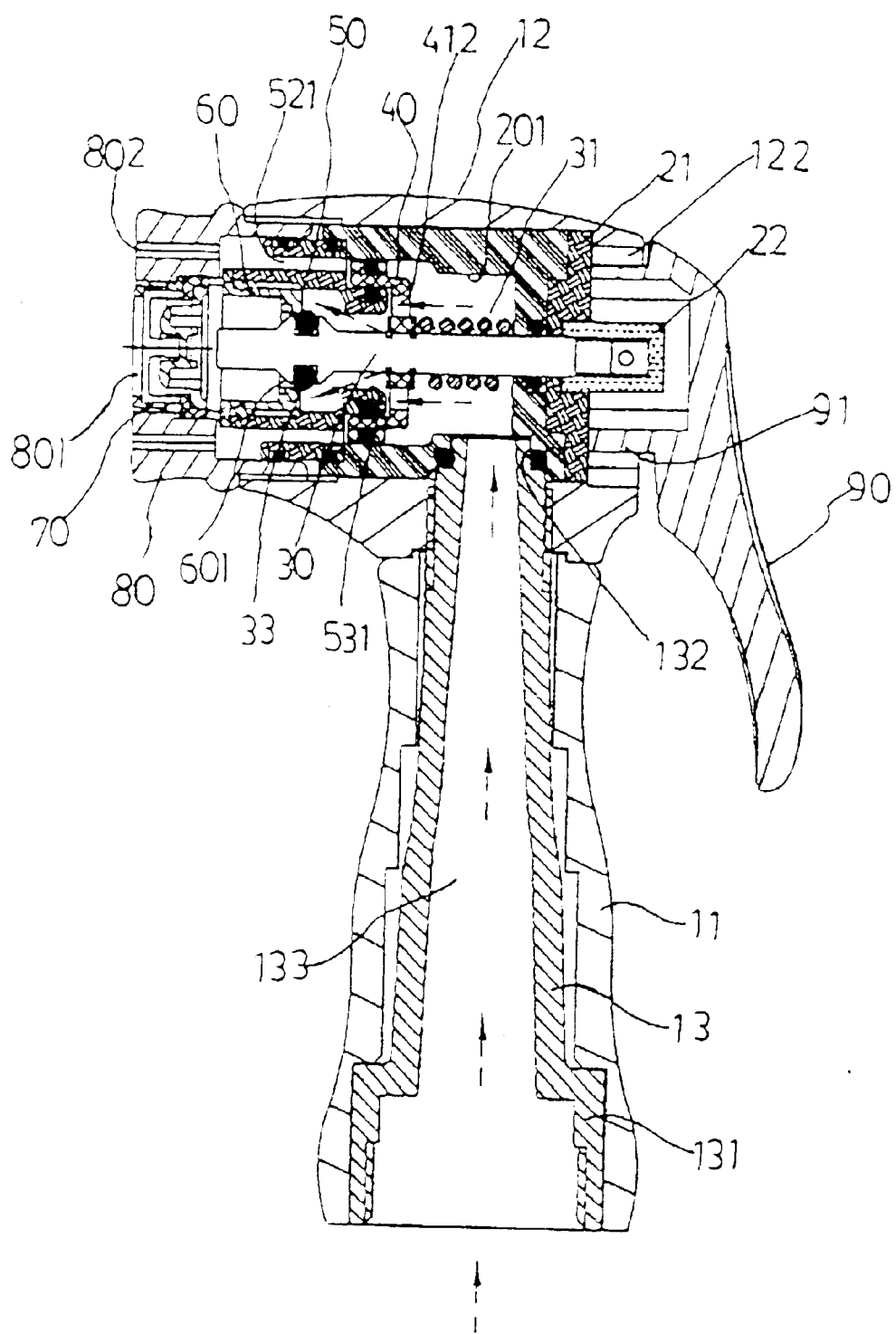
FIG. 3 is a sectional view showing the preferred embodiment of the present invention is in use.

Referring to FIGS. 1, 2, and 3, a preferred embodiment of the present invention for a kitchen faucet provided with a spray head is essentially comprised of a body 10 including a base holder 11, an adapter 12, an inner tube 13, an inner cylinder 20, a cartridge 30, a guide 40, a diverter 50, a retaining ring 60, a wave generator 70, a spout 80 and a control handle 90. The inner tube 13 containing a supply pipe 133 is inserted into the base holder 11. The supply pipe 133 relates to a reduced pipe having wider bottom and smaller top. The top of the supply pipe 133 is provided with an externally threaded coupling 132 to be locked into the adapter 12, and the bottom in larger diameter is provided with an internally threaded coupling 121 to be pivoted to an extension hose (not illustrated). The adapter 12 has a hollow 121 provided inside, a threaded coupling hole 122 at the bottom, a larger opening internally threaded at the front, and a through hole 123 at the rear to be connected to the control handle 90. The inner cylinder 20 contains a three-gradation hollow 201, an axial hole 203 at the rear for the cartridge 30 to pass through, and a through hole 202 at bottom and closer to the rear for receiving the insertion by the inner tube. A cylinder cover 21 having an axial 211 is first connected to the rear of the inner cylinder 20 and the inner cylinder is then placed into the hollow 121 of the adapter 12. A double flange 301 sandwiching a resilient washer 33 is provided at where closer to the front cartridge 30 to be inserted through an axial hole 411 in the guide 40 and a through hole 531 in the diverter 50; and the rear of the cartridge 30 is threaded and inserted with a coil 31 before passing through the inner cylinder 20, the adapter 12 and locked to a connection sleeve 22, which in turn is connected to a pivot 91 of the control handle 90 by means of a pin. A pair of C rings 32 is used to retain the center of the cartridge 30 in the axial hole 411 of the guide 40. The guide 40 is provided with an opening 42 at its front to be coupled to a protrusion 53 from the end of the diverter 50, and a protrusion 41 containing an axial hole 411 and a guide hole 412 at its rear. The guide 40 is coupled to the diverter 50 and rests on the second gradation in the inner cylinder 20 while the second half of the diverter rests in the opening of the guide 40. The diverter 50 has a hollow 51, a threaded opening in font to be locked to the retainer ring 60, a protrusion 53 in the rear to be inserted into the hollow 42 of the guide 40, and an outer gasket 52 at the protrusion 53 provided on its end surface multiple guide holes 521 penetrating through the outer gasket 52. The retainer ring 60 has an opening at front, a through hole 601 in a diameter slightly smaller than that of the washer 33, and the outer circumference being threaded to be locked to the hollow 51 in the diverter 50. An externally threaded coupling 81 is provided to the rear of the spout 80 for the spout 80 to be locked into the opening of the adapter 12, and a hollow 811 with an opening in the spout 80 is provided to accommodate the diverter 50, and a main hole 801 in smaller diameter is provided at the front of the spout 80 to accommodate a wave generator 70 comprised of a first dispersion member 71, a washer 72 and a strainer 73, and a second dispersion member 74. Wherein, the first dispersion member is provided with a central hole and a side groove, and the second dispersion member is also provided with a side groove. Multiple minute pores 802 penetrating through the hollow 811 are provided on the outer circumference of the main hole 801.

Figure 4:
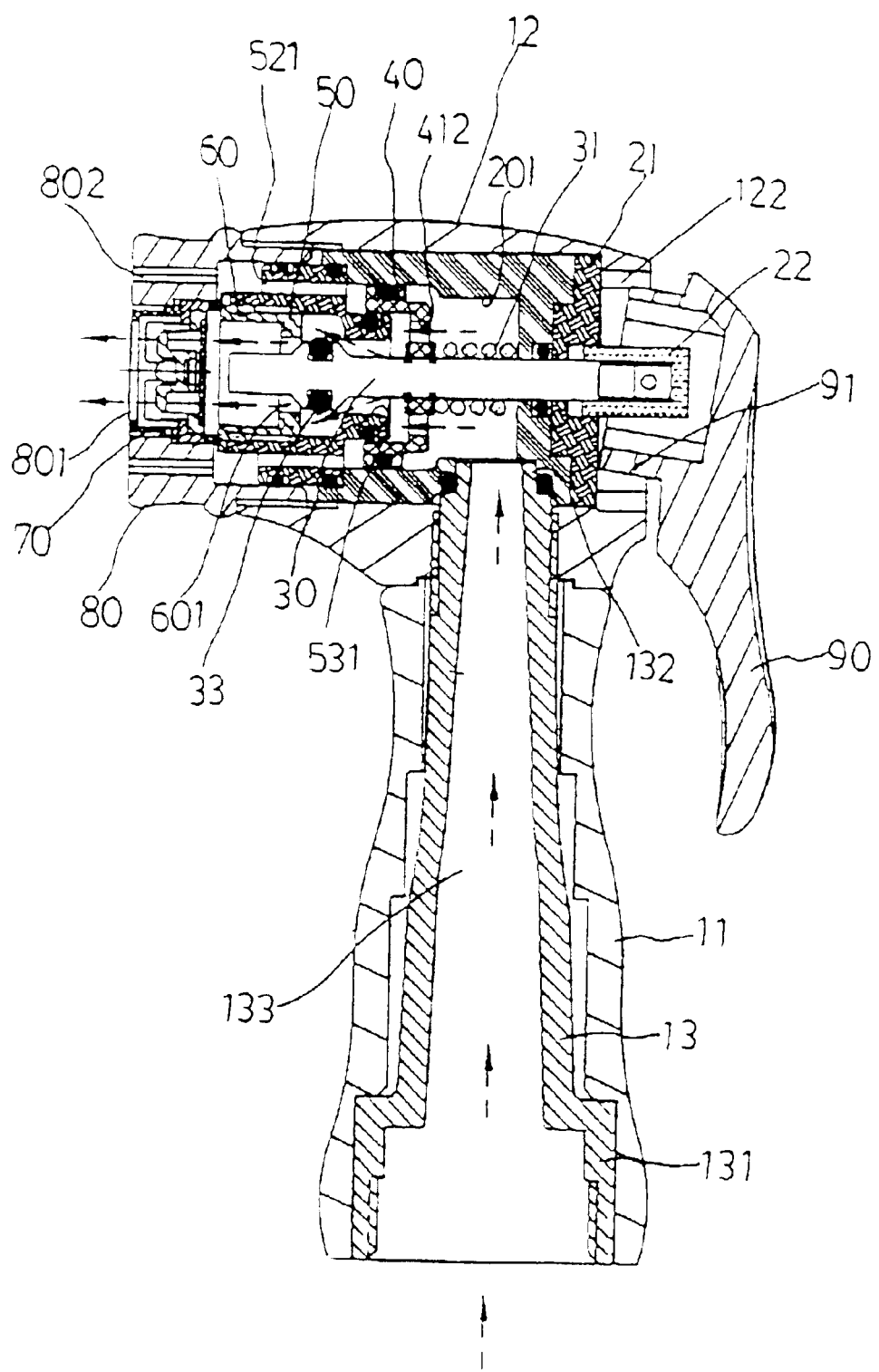
FIG. 4 is another sectional view showing the preferred embodiment of the present invention is in use.
Figure 5:
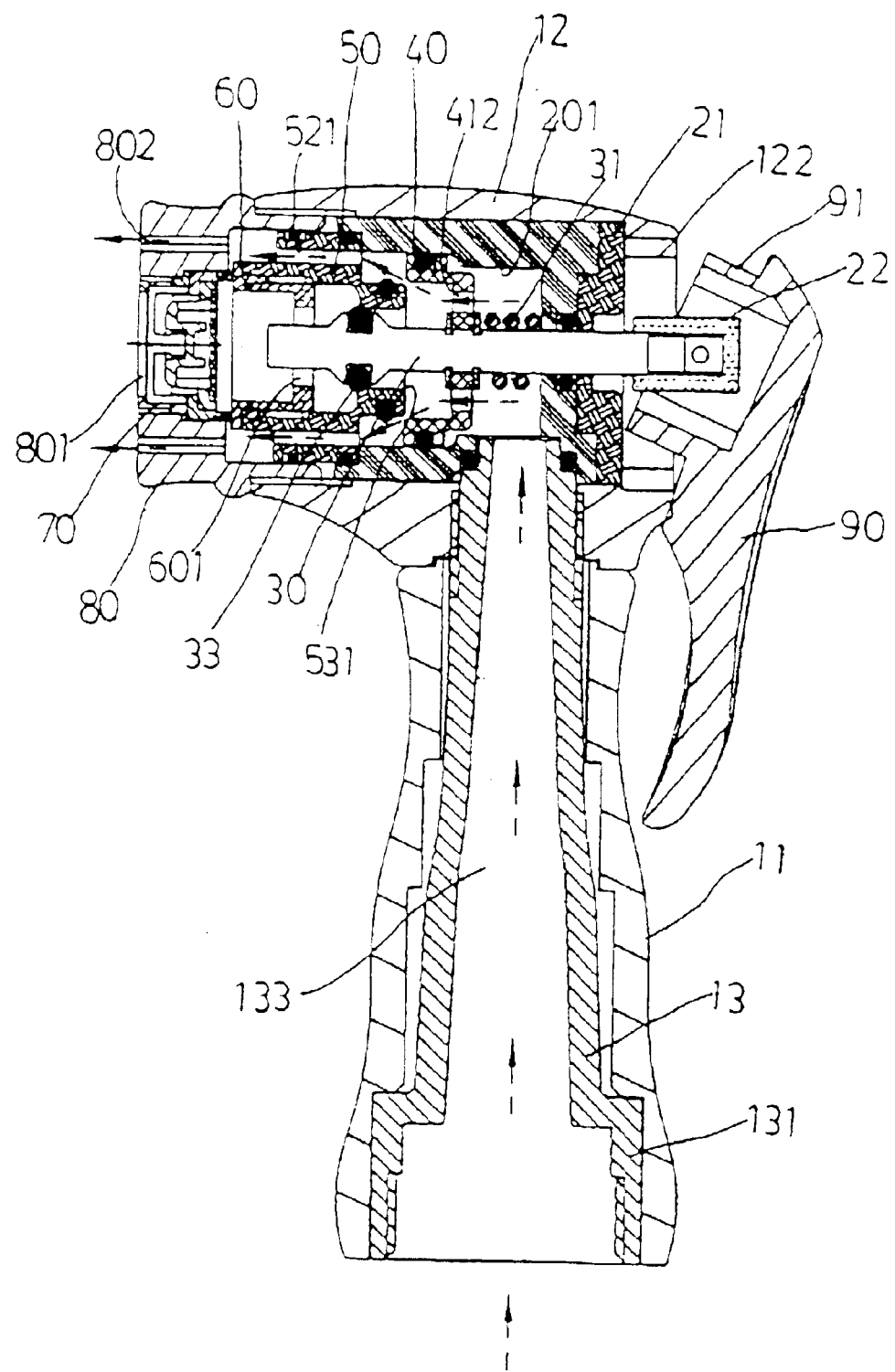
FIG. 5 is another sectional view yet showing the preferred embodiment of the present invention is in use.

As illustrated in FIGS. 4 and 5, a proper force is applied onto the control handle 90 to press it down for a certain extent before turning it to pull back the connection sleeve 22 pivoted to the control handle 90 and in turn, to pull back the cartridge 30. Both of the guide 40 and the washer 33 move backward to permit the through hole 601 of the retainer ring 60 to open. Meanwhile, water entering from the inner tube of the body 10 flows through the guide hole 412 of the guide 40, then diverted by the through hole 531 of the diverter, then the through hole 601 of the retainer ring 60 and the wave generator 70 to be forced to increase the flow velocity and form a powerful jet upon leaving the main hole 801 of the spout 80. As illustrated in FIG. 5, when an even greater force is applied to press and rotate all way down the control handle 90, the cartridge 30 is given its maxiral displacement at the same time to move the guide 40 back until it is cleared away from the protrusion 53 of the diverter 50. In turn, the hollow 42 of the guide 40 is connected through the guide hole 521 of the diverter 50, and the retreating washer 33 closes up the through hole 513 of the diverter 50. Therefore, the water entering from the inner tube 13 flows through the guide hole 412 of the guide to the spout 80 through the guide hole 521 of the guide 50 to sprinkle the water from those multiple minute pores 802 of the spout 80. When the control handle 90 is released, the cartridge 41 for being subject to the coil 31 returns to its place in the configuration as illustrated in FIG. 3, and stops the delivery of water since both of the through hole 601 of the retaining ring 60 and the guide hole 521 of the diverter 50 are closed up.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A sink faucet with spray head comprising:

a body including a base holder, an adapter, an inner tube; the inner tube being provided in the hollow of the base holder in a reduced supply pipe with wider bottom and smaller top, the supply pipe having an externally threaded coupling on its top to be locked into the adapter and on its bottom in larger diameter being provided with an internally threaded coupling; the adapter having a hollow provided inside, a threaded coupling hole at the bottom, a larger opening internally threaded at the front, and a through hole at the rear; an inner cylinder, containing a three-gradation hollow, an opening at front, an axial hole at the rear, a through hole at bottom where close to the rear, a cylinder cover provided with an axial being adapted to the rear of the inner cylinder and placed into the hollow of the adapter, and the top of the inner tube being inserted into the through hole at bottom of the inner cylinder;

a guide, containing a hollow with an open front, a protruded rear, an axial hole and multiple guide holes;

a diverter, having a hollow inside, an opening at front being internally threaded, a rear protrusion with a through hole in smaller diameter, an external gasket with multiple guide holes being provided to where close the protrusion, the protrusion being incorporated into the hollow of the guide and inserted into the gradation inside the inner cylinder, the guide being located in the hollow, and the second half of the diverter being located in the hollow in the opening; a cartridge, a double flange sandwiching a resilient washer being provided at where closer to the front cartridge, inserted through an axial hole in the guide and a through hole in the diverter, the rear of the cartridge being threaded and inserted with a coil before passing through the inner cylinder, the adapter, exposed and locked to a connection sleeve, and a pair of C rings being used to retain the center of the cartridge in the axial hole of the guide;

a retaining ring, having a hollow, a front opening, a through hole in diameter smaller than the outer diameter of the washer of the cartridge at the rear, and a threaded outer circumference to be locked into the hollow of the diverter;

a wave generator, including a first dispersion member, gasket, stainer and a secondary dispersion member;

a spout, having a hollow provided with an opening end, threaded outer circumference being locked to the adapter, a main hole in smaller diameter being provided at the front to accommodate the wave generator, multiple minute holes penetrating the front and the hollow being provided on the outer circumference of the main hole; and a control handle, having a pivot provided in the upper front, and connected to a connection sleeve by means of a pin.

* * * * *